United States Patent
Tay et al.

(10) Patent No.: US 9,723,302 B2
(45) Date of Patent: Aug. 1, 2017

(54) MEASUREMENT SYSTEM AND MEASUREMENT METHOD FOR MEASURING VIDEO PROCESSING QUALITY

(71) Applicant: Rohde & Schwarz Asia Pte., Ltd., Singapore (SG)

(72) Inventors: Chun Guan Tay, Singapore (SG); Rajashekar Durai, Singapore (SG)

(73) Assignee: ROHDE & SCHWARZ ASIA PTE., LTD, Singapore (SG)

( * ) Notice: Subject to any disclaimer, the term of this patent is extended or adjusted under 35 U.S.C. 154(b) by 0 days.

(21) Appl. No.: 14/783,739

(22) PCT Filed: Oct. 31, 2013

(86) PCT No.: PCT/SG2013/000471
§ 371 (c)(1),
(2) Date: Oct. 9, 2015

(87) PCT Pub. No.: WO2014/175823
PCT Pub. Date: Oct. 30, 2014

(65) Prior Publication Data
US 2016/0301924 A1    Oct. 13, 2016

(30) Foreign Application Priority Data
Apr. 24, 2013   (SG) .............................. 201303104-2

(51) Int. Cl.
*H04N 17/00* (2006.01)
*G06K 7/10* (2006.01)
*H04M 1/24* (2006.01)

(52) U.S. Cl.
CPC ......... *H04N 17/004* (2013.01); *G06K 7/1092* (2013.01); *G06K 7/1095* (2013.01); *H04M 1/24* (2013.01)

(58) Field of Classification Search
CPC ...... H04N 17/004; H04N 17/04; H04N 17/00; H04N 17/002; H04N 17/02
(Continued)

(56) References Cited

U.S. PATENT DOCUMENTS

2008/0143838 A1* 6/2008 Nadabar ............ H04N 1/00002
348/187
2008/0253608 A1* 10/2008 Long ........................ G06K 7/14
382/100
(Continued)

FOREIGN PATENT DOCUMENTS

DE   10112528 A1   9/2002
EP   0789497 A2    8/1997
(Continued)

*Primary Examiner* — Sherrie Hsia
(74) *Attorney, Agent, or Firm* — Ditthavong & Steiner, P.C.

(57) ABSTRACT

A measuring system for measuring video processing quality of a device under test includes a measuring device comprising transmission means set up for transmitting a video to the device under test. The device under test is set up for receiving the video and displaying it using a display included by the device under test. The video includes at least a first barcode to be displayed for a first duration. The measuring system includes a barcode reader set up for reading the first barcode from the display of the device under test. The measuring system is set up for determining the video processing quality of the device under test based upon measuring results of the barcode reader.

15 Claims, 3 Drawing Sheets

(58) Field of Classification Search
USPC ........ 348/180, 184, 182, 187–189, 192, 193
See application file for complete search history.

(56) References Cited

U.S. PATENT DOCUMENTS

| | | |
|---|---|---|
| 2010/0248641 A1 | 9/2010 | Schumacher |
| 2011/0263243 A1 | 10/2011 | Topaltzas et al. |

FOREIGN PATENT DOCUMENTS

| | | |
|---|---|---|
| EP | 0888019 A1 | 12/1998 |
| EP | 1377080 A1 | 1/2004 |
| EP | 1926325 A2 | 5/2008 |
| EP | 2239952 A1 | 10/2010 |
| WO | 2014175823 A1 | 10/2014 |

* cited by examiner

MEASUREMENT SYSTEM AND MEASUREMENT METHOD FOR MEASURING VIDEO PROCESSING QUALITY

CROSS-REFERENCE TO RELATED APPLICATION

The present application is a national phase application of PCT Application No. PCT/SG2013/000471, filed Oct. 31, 2013, which claims priority to Singapore Patent Application No. 201303104-2, filed on Apr. 24, 2013, the entire contents of which are herein incorporated by reference.

TECHNICAL FIELD

The invention, according to the various embodiments described herein, relates to a measuring system and measuring method for measuring a video processing quality of a device under test, preferably a user equipment such as a smartphone.

BACKGROUND

For determining a user experience when viewing a video, especially a streaming video on a smartphone, the correct reception and display of each single frame is the most important criteria. Although image errors or skipped frames can be tolerated up to a certain amount, the measurement of these parameters is of relevance to a user experience determination.

There exist systems for measuring the image quality of a video transmission. For example the German patent application DE 101 12 528 A1 shows such a system. The system though is disadvantageous, since a high computational power is required in order to analyze the images that have been received by the device under test, since an image recognition comprising a correlation with a transmitted test image is performed.

SUMMARY

A measuring system and a measuring method capable of determining the video processing quality of a device under test without requiring expensive hardware or a high computational complexity, are provided herein.

A measuring system for measuring video processing quality of a device under test includes a measuring device comprising transmission means set up for transmitting a video to the device under test. The device under test is set up for receiving the video and displaying it using a display included by the device under test. The video includes at least a first barcode to be displayed for a first duration. The measuring system includes a barcode reader set up for reading the first barcode from the display of the device under test. The measuring system is set up for determining the video processing quality of the device under test based upon measuring results of the barcode reader. This setup allows the measurement of video processing quality with a low computational complexity and low hardware costs.

In one embodiment, the video includes a second barcode to be displayed for a second duration. The barcode reader is then set up for reading the second barcode from the display of the device under test. It is thus possible to detect a minimum duration necessary for displaying the barcode in order for the device under test to correctly display it.

In yet another embodiment, the video includes a plurality of barcodes to be displayed consecutively for a constant or decreasing or increasing duration. This allows an even more accurate detection of the video processing quality.

In one embodiment, the video includes a gap of a certain duration, during which no barcode is displayed after each barcode. In case of more than one barcode being present in the video, the duration of consecutive gaps is constant or increasing or decreasing. This allows for a processing time of the barcode reader. A lower cost barcode reader can therefore be used.

In yet another embodiment, the video includes a distinct barcode for each frame of the video. This allows for a very accurate detection of the video processing quality.

The barcode reader may be set up for processing barcodes with at least the frame rate of the video. This even further increases the measurement accuracy.

The transmission means of the measuring device may be set up for transmitting the video at a changing frame rate and/or bitrate and/or bit error rate and/or resolution and/or latency between packet transmission and/or video coding scheme. The measuring system may then be set up for determining the video processing quality based upon a correct barcode reception by the barcode reader. This allows for testing the video processing quality of the device under test under different conditions.

The measuring system may include a control unit set up for controlling the function of the measuring device and of the barcode reader. The control unit may then be set up for determining the video processing quality of the device under test. This enables an automatic measurement process.

A measuring method serves the purpose of measuring a video processing quality of a device under test. A video is transmitted to the device under test. The device under test is set up for receiving the video and displaying it using a display included by the device under test. The video includes at least a first barcode to be displayed for a first duration. The first barcode is read from the display of the device under test. The video processing quality of the device under test is determined based upon measuring results of reading the barcode. This setup allows the measurement of video processing quality with a low computational complexity and low hardware costs.

An exemplary embodiment of the invention is no further explained with respect to the drawings, in which.

Figure 1:
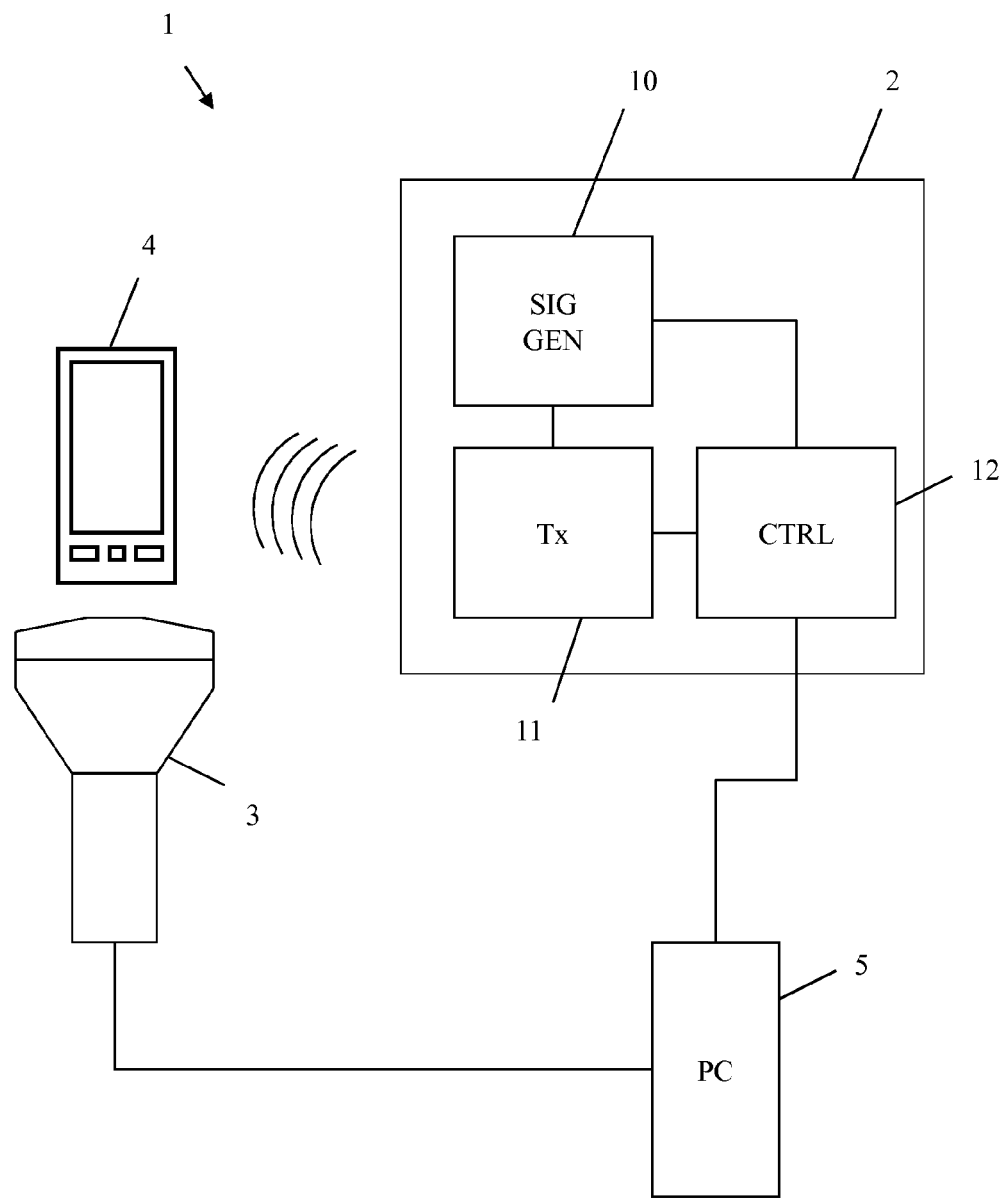
FIG. 1 shows an exemplary embodiment of a measuring system in a block diagram.

First we demonstrate the construction and function of an exemplary embodiment of the measuring system with respect to FIG. 1. With respect to FIG. 2-FIG. 5 we furthermore show different possible test video compositions. Finally, along FIG. 6 we demonstrate the function of an embodiment of the measuring method. Similar entities and reference numbers in different figures have been partially omitted.

In FIG. 1 an embodiment of the measurement system 1 is shown. The measurement system 1 includes a measuring device 2, a barcode reader 3 and a personal computer 5. The measuring system 1 is set up for measuring the video processing quality of a device under test 4, for example a mobile phone, for example a smartphone.

The measuring device 2 includes signal generating means 10, transmission means 11 and control means 12. The control means 12 are set up for controlling the function of the signal generation means 10 and the transmission means 11. The control means 12 controls the signal generation means 10 so that the signal generation means 10 generate a signal comprising a video to be transmitted to the device under test 4. The signal generation means 10 transmits the signal to the transmission means 11, which create a radio frequency signal and transmit it to the device under test 4. The transmission means 11 and the device under test 4 are either connected to each other over-the-air or through a cable connection. In FIG. 1 an over-the-air-connection is depicted.

The signal generated by the signal generation means 10 includes a video to be displayed by the device under test 4. This video can either be a streaming video or a video file. When the device under test 4 receives the video, it is set up for starting to display the video on its screen. The described barcode reader 3 is set up for reading barcodes from the screen of the device under test 4, which are present within the video, which is displayed by the display of the device under test 4.

The barcode reader 3 and the measuring device 2 are controlled by the personal computer 5. The personal computer 5 instructs the measuring device 2 to generate and transmit the signal comprising the video to the device under test 4. The personal computer 5 instructs the barcode reader 3 to read the barcodes from the display of the device under test 4. Moreover, the personal computer 5 receives measuring results of the barcode reader 3 and processes them.

In an alternative embodiment, the measuring system 1 does not include a personal computer 5. The barcode reader 3 is then directly connected to the control means 12 of the measuring device 2. The control means 12 then fulfill the entire function of the personal computer 5. The control means 12 then control the function of the barcode reader 3 and receive measuring results of the barcode reader 3. The control means 12 then also process the measuring results of the barcode reader 3 and the display them on a display connected to the measuring device 2, which is not shown in FIG. 1.

Figure 6:
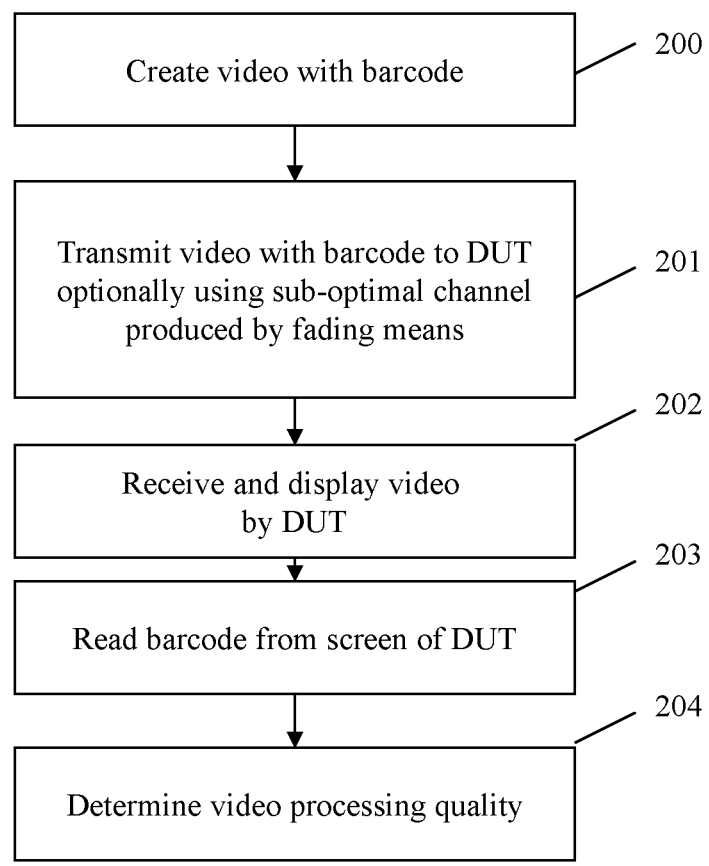
FIG. 6 shows an exemplary embodiment of a measuring method in a flow chart.

Alternatively, the device under test 4 and the transmission means 11 are not connected through an ideal channel, but through fading means, producing a sub-optimal transmission channel (FIG. 6). Then it is possible to determine the ability of the device under test 4 to receive and display the video under sub-optimal transmission conditions. Alternatively, the transmission means 11 may be set up for creating the RF-signal so that it is already modified accordingly.

Figure 2:
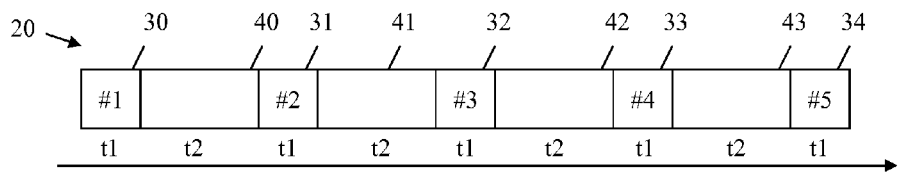
FIG. 2 shows a first exemplary test video in a time-diagram.

In FIG. 2, a first time-sequence 20 of the video transmitted to the device under test 4 of FIG. 1 is shown. A first barcode 30 is displayed for a first duration t1. After that, a first gap 40 is displayed for a second duration t2. After that, a second barcode 31 is displayed for the first duration t1. A second gap 41 is displayed for the duration t2. A third barcode 32 is then displayed for a duration t1. Following this sequence, more gaps 42, 43 and more barcodes 33, 34 are displayed successively. A gap always follows on a barcode. The barcodes always are displayed for the duration t1, while the gaps are displayed for the duration t2. All barcodes 30-33 are displayed for the same duration t1. All gaps 40-43 are displayed for the same duration t2. The barcodes 30-34 each are different. This difference can be discerned by the barcode reader 3 of FIG. 1. With this setup, it is possible to measure the capability of the device under test 4 of FIG. 1 to correctly display the barcodes 30-34 and to determine, if any of the barcodes are not displayed correctly.

Though, it is not possible to determine, if the device under test 4 is capable of displaying each frame of each barcode 30-34, and if frames during the gaps 40-43 are not displayed correctly or omitted altogether.

Figure 3:
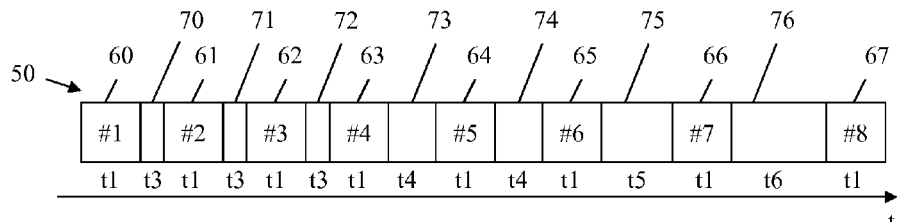
FIG. 3 shows a second exemplary test video in a time-diagram.
Figure 4:
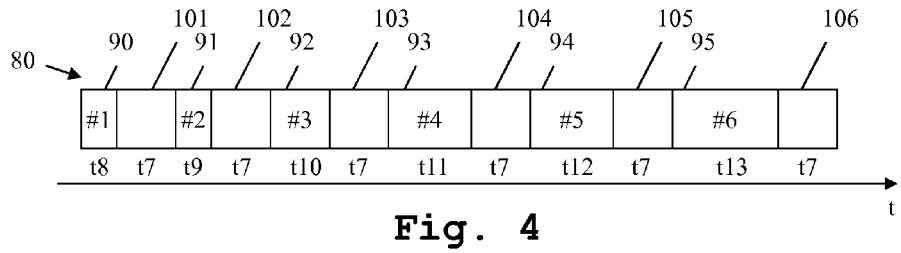
FIG. 4 shows a third exemplary test video in a time-diagram.

Therefore, in FIG. 3, a second time-sequence 50 of the video is shown. Barcodes 60-67 are displayed alternating with gaps 70-76. The barcodes 60-67 are displayed for the duration t1 as the barcodes 30-34 were displayed according to FIG. 2. The time interval of the gaps 70-76 though is changed during the time-sequence 50. First, a rather short gap of a length t3 is used. The gaps 70-73 are displayed for the duration t3. After that, the duration of display of the gaps 73-74 is increased to t4, which is longer than t3. After that, the duration is even more increased, so that the gap 75 is displayed for a duration t5, which is longer than the duration t4 and the gap 76 is displayed for a duration of t6, which again is longer than the duration t5. With the setup, it is possible to discern, how long of a gap 70-76 is needed between the display of barcodes 60-67 in order to reach maximum video processing quality. Alternatively, the time-sequence can be started with a long gap display duration. Then the gap display duration is decreased during the time-sequence.

This setup though is not able to discern, how long a barcode has to be transmitted within the video for the device under test 4 to be able to correctly display it so that the barcode reader 3 can correctly identify the barcode. In the time-sequence 80 of FIG. 4, this problem is solved by amending the duration of barcode display during the time-sequence 80. Barcodes 90-95 are displayed alternating with gaps 101-106. The gaps 101-106 are all displayed for the duration of t7, which in this example is identical to the duration t1.

The barcodes 90-95 though are displayed with increasing durations t8-t13. A first barcode 90 is displayed for a duration of t8, which is shorter than the duration t7, for which the gaps 101-106 are displayed. The second barcode 91 is displayed for a duration t9, which is larger than the duration t8, the third barcode 92 is displayed for a duration t10, which is larger than the duration t9. The fourth barcode 93 is displayed for a duration t11, which is larger than the duration t10. The fifth barcode 94 is displayed for a duration t12, which is larger than the duration t11. The sixth barcode 95 is displayed for a duration t13, which is larger than the duration t12. With the setup, it is therefore possible to discern, how long a barcode has to be present within the video for the device under test 4 to be able to correctly receive a display in the barcode, so that the barcode reader 3 can correctly identify the barcode 90-95. Alternatively, the duration of display of the barcodes can also be decreased starting from a large duration instead of increase starting from a small duration.

Furthermore, in an alternative embodiment, it is possible to change the duration of the display of the barcodes and change the duration of the display of the gaps. Also in this embodiment it is possible to increase and/or lower the individual duration of display of gaps or barcodes. Furthermore, it is possible to repeat these sequences, depicted above in order to increase measuring accuracy.

Figure 5:
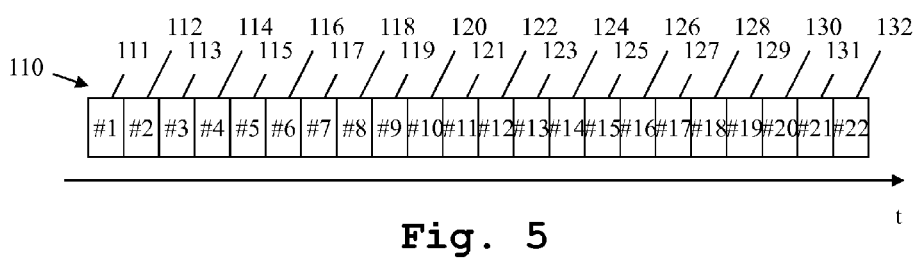
FIG. 5 shows a forth exemplary test video in a time-diagram.

Finally, a fourth time-sequence 110 is displayed in FIG. 5. In FIG. 5 no gaps are displayed between the barcodes

111-132. All of the barcodes 111-132 are displayed for an identical duration, which corresponds to a fixed or varying duration.

In a special case, the duration of displaying the barcodes 111-132 is the duration of a single frame at the current frame-rate of the video. Therefore, each barcode is displayed for the length of exactly one frame. When using a time-sequence 110, with a different barcode at each frame of the video, it is necessary to use a barcode reader 3 of FIG. 1, which is able to read barcodes off the screen of the device under test 4 in such a high speed. If this is the case, it is possible to identify if each single frame of the video is displayed correctly, by detecting the correct barcodes 111-132 at the correct timing by the barcode reader 3.

The barcodes detected by the barcode reader 3 and the respective timings are transmitted to the personal computer 5 in the embodiment of FIG. 1 or alternatively to the control means 12, if no personal computer 5 is present. The personal computer 5 or respectively the control means 12 are then set up for determining based upon the timing and the detected barcode, whether the barcode was detected correctly and therefore if the barcode was received and displayed correctly by the device under test 4.

In FIG. 6, an embodiment of the measuring method is shown. In a first step 200, a video comprising at least one barcode is created. Alternatively, the video can include more than one barcode. The barcodes can be separated by gaps. Moreover, the video can be created as a streaming video or as a video file. In a second step 201, the video is transmitted to the device under test. Optionally, a sub-optimal transmission-channel, produced by a fading means, can be used.

In a third step 202, the video is received by the device under test and displayed by the device under test. Naturally, the device under test can only display parts of the video that have been correctly received.

In a fourth step 203, the barcodes, which are present within the video and now displayed on the screen of the device under test, are read from the screen of the device under test. For example, a barcode reader 3 of FIG. 1 can be used for this. Alternatively, also a video camera or a high resolution still image camera can be used.

In a fifth step 204, based upon the identified barcodes and the timing of identifying the barcodes, the video processing quality of the device under test is determined. For example, it is determined, if frames are skipped. Moreover, it is determined, how many frames are so badly distorted, that the barcode cannot be detected correctly.

The invention is not limited to the examples shown above. Especially, the invention is not limited to a specific video format, transmission type, telecommunication standard or device under test type. Any smartphone, network-capable camera, regular telephone, etc. can be analyzed regarding its video processing quality. The characteristics of the exemplary embodiments can be used in any advantageous combination.

The invention claimed is:

1. A measuring system for measuring video processing quality of a device under test, comprising:
a measuring device comprising transmission means for transmitting a video to the device under test, wherein:
the device under test receives the video and displays it using a display comprised by the device under test,
the video comprises at least a first barcode to be displayed for a first duration,
the measuring system comprises a barcode reader for reading the first barcode from the display of the device under test, and the measuring system determines the video processing quality of the device under test based upon measuring results of the barcode reader, and
the device under test and the transmission means are not connected through an ideal channel, but through fading means, producing a sub-optimal transmission channel.

2. The measuring system according to claim 1, wherein:
the video comprises a second barcode to be displayed for a second duration, and
the barcode reader reads the second barcode from the display of the device under test.

3. The measuring system according to claim 2, wherein the video comprises a plurality of barcodes to be displayed consecutively for a constant or decreasing or increasing duration.

4. The measuring system according to claim 3, wherein:
the video comprises a gap of a certain duration, during which no barcode is displayed after each comprised barcode, and
in case of more than one barcodes being present in the video, the duration of consecutive gaps is constant or increasing or decreasing.

5. The measuring system according to claim 4, wherein the video comprises a distinct barcode for each frame of the video.

6. The measuring system according to claim 5, wherein the barcode reader processes barcodes with at least the frame rate of the video.

7. The measuring system according to claim 6, wherein:
the transmission means of the measuring device transmits the video at a changing frame rate and/or bitrate and/or bit error rate and/or resolution and/or latency between packet transmission and/or video coding scheme, and
the measuring system determines the video processing quality based upon a correct barcode reception by the barcode reader.

8. The measuring system according to claim 7, wherein:
the measuring system comprises a controller for controlling the function of the measuring device and of the barcode reader, and
the controller determines the video processing quality of the device under test.

9. A method for measuring video processing quality of a device under test, the method comprising:
transmitting a video to the device under test, and
receiving the video by the device under test and displaying it using a display comprised by the device under test, wherein:
the video comprises at least a first barcode to be displayed for a first duration,
the first barcode is read from the display of the device under test,
the video processing quality of the device under test is determined based upon measuring results of reading the barcode, and
a sub-optimal transmission channel is produced through a fading means and the device under test and the transmission means are not connected through an ideal transmission means.

10. The method according to claim 9, wherein:
the video comprises a second barcode to be displayed for a second duration, and
the second barcode is read from the display of the device under test.

11. The measuring method according to claim 10, wherein the video comprises a plurality of barcodes to be displayed consecutively for a constant or decreasing or increasing duration.

12. The method according to claim 11, wherein:
the video comprises a gap of a certain duration, during which no barcode is displayed after each comprised barcode, and
in case of more than one barcodes being present in the video, the duration of consecutive gaps is constant or increasing or decreasing.

13. The method according to claim 12, wherein the video comprises a distinct barcode for each frame of the video.

14. The method according to claim 13, wherein barcodes are processed with at least the frame rate of the video.

15. The method according to claim 14, wherein:
the transmission of the video is performed at a changing frame rate and/or bitrate and/or bit error rate and/or resolution and/or latency between packet transmission and/or video coding scheme, and
the video processing quality is determined based upon a correct barcode reception by the barcode reader.

* * * * *